Sept. 20, 1932.    H. A. AGRICOLA    1,878,571
GAUGE BAR
Filed July 26, 1929    2 Sheets-Sheet 1
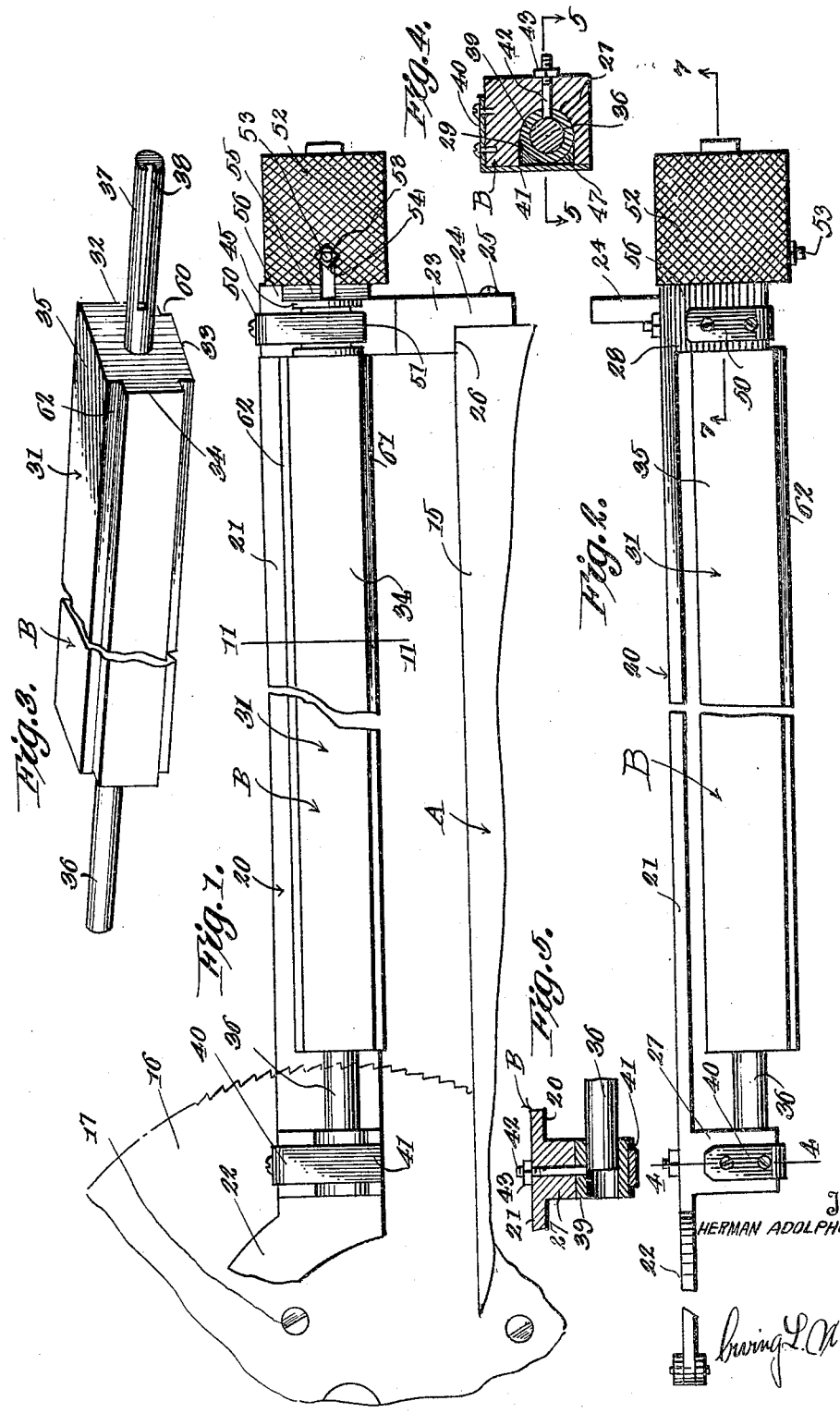
Inventor
HERMAN ADOLPHUS AGRICOLA
Attorney

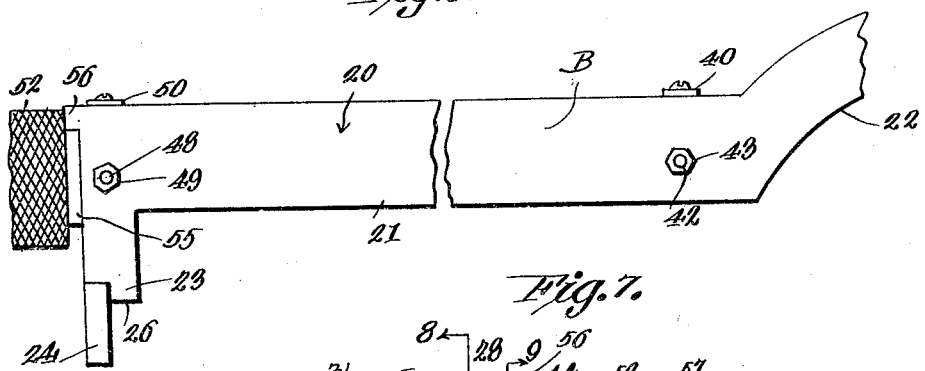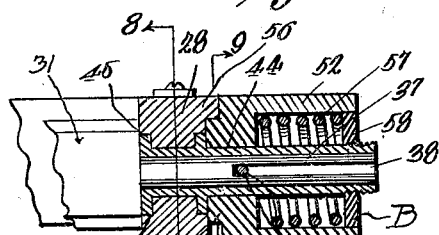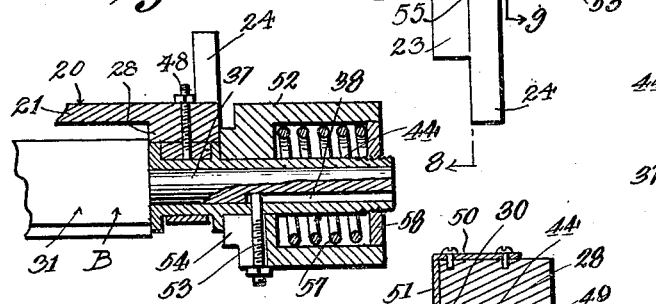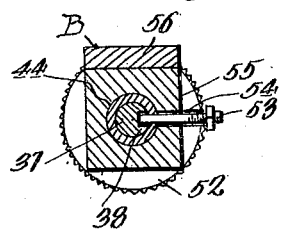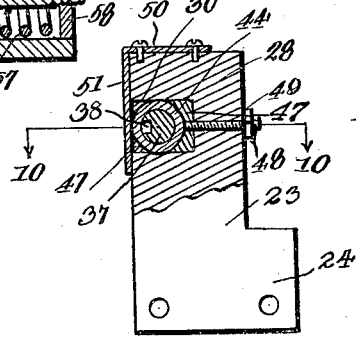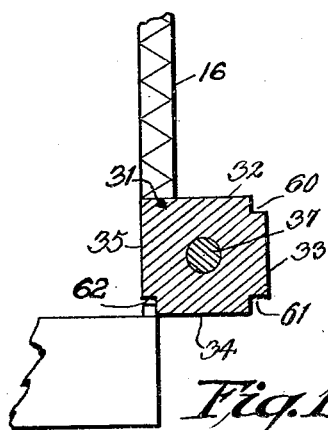

Patented Sept. 20, 1932

1,878,571

UNITED STATES PATENT OFFICE

HERMAN A. AGRICOLA, OF ATLANTA, GEORGIA

GAUGE BAR

Application filed July 26, 1929. Serial No. 381,376.

This invention appertains to gauges for sawing machines of the type particularly employed by printers for cutting type bars, slugs, etc.

One of the primary objects of my invention is to provide a rotatable gauge bar for either band saw or rotary saw machines having independent gauge faces around the periphery or sides thereof, whereby upon turning of the gauge bar, the desired gauge face can be brought into operative position relative to the saw and saw table, different gauge faces being adapted for cutting material and metal type lines, a pica, a half pica, a pica with a selective lug or projection higher than the face of type casted on a bar of metal or slug without resorting to the use of the point gauge, and for gauging the cutting of the blank portion of type bar casted by linotype or slug casting machines.

Another important object of my invention is to provide a gauge bar rotatably carried by the saw table longitudinally thereof and longitudinal of the diametric center of the saw, which can be readily turned and held in its adjusted position for bringing the desired gauge face into operative position relative to the table and saw, the gauge bar being accurate in use and eliminating error contingent with the use of the conventional point gauge.

A further important object of my invention is the provision of novel means for mounting the rotatable gauge bar on the saw table whereby the gauge bar itself can be adjusted toward and away from the saw to take care of the varying thickness of the saw incident to the sharpening thereof.

A still further object of my invention is to provide an improved device of the above character, which will be durable and efficient in use, one that will be simple and easy to manufacture, and one which can be placed upon the market and incorporated with a conventional band or rotary saw machine at a low cost.

With these and other objects in view, the invention consists in the novel construction, arrangement and formation of parts, as will be hereinafter more specifically described, claimed, and illustrated in the accompanying drawings, in which drawings:

Figure 1 is a side elevation of my improved device showing the same applied to a conventional rotary saw machine;

Figure 2 is a top plan view of my improved device:

Figure 3 is a detail perspective view of the bar gauge;

Figure 4 is a detail section taken on the line 4—4 of Figure 2 looking in the direction of the arrows illustrating the construction of the bearing for the inner end of the gauge bar;

Figure 5 is a detail section taken on the line 5—5 of Figure 4 looking in the direction of the arrows;

Figure 6 is a rear elevation of my improved device;

Figure 7 is a detail longitudinal section taken on the line 7—7 of Figure 2 showing the forward bearing for the bar gauge and the means for adjusting the same;

Figure 8 is a vertical section through the forward bearing taken on the line 8—8 of Figure 7 looking in the direction of the arrows;

Figure 9 is a detail vertical section taken on the line 9—9 of Figure 7 looking in the direction of the arrows illustrating the locking means for holding the bar gauge in adjusted position against accidental turning movement;

Figure 10 is a horizontal section taken on the line 10—10 of Figure 8 looking in the direction of the arrows, and Figure 11 is a detail transverse section through the bar gauge showing the different gauge faces or sides thereof, taken on the line 11—11 of Figure 1, the saw and slug being shown in position.

Referring to the drawings wherein similar reference characters designate corresponding parts throughout the several views, the letter A generally indicates a conventional rotary saw machine employed for cutting type bars, slugs, and the like and B my improved gauge therefor.

Only sufficient parts of the saw machine A have been illustrated to show the use of my invention, and as shown the machine A embodies the usual saw table 15 and rotary saw blade 16 carrying the trimmer knives 17.

My improved device B embodies a suitable support 20 which may be in the nature of a single casting and includes a flat body plate 21 having an arcuate inner end 22 which may constitute a guard for the saw. This end 22 may be hinged to the saw table as at 22' to permit the device B to be swung away from the saw when necessary or desirable (see Figure 2). The plate 21 is normally held rigid to the table 15 by means of a depending arm 23 having a reduced connecting lug 24 which is connected to the table by the use of suitable fastening elements 25. At the point of juncture of the reduced lug 24 with the table 15, the same forms a shoulder 26 for abutting against the saw table 15. The body 21 adjacent to its opposite ends supports inwardly directed bearing blocks 27 and 28, each having formed in the outer face thereof bearing slots or notches 29 and 30 respectively.

Forming the salient part of my device is the bar gauge 31 which is of a substantially square shape in cross section defining flat gauge faces 32, 33, 34 and 35, which will be later described. The opposite ends of the gauge bar 31 are provided with elongated longitudinally extending spindles or shafts 36 and 37 and it is to be noted that the spindle or shaft 37 is provided with a longitudinally extending keyway 38. The spindle or shaft 36 is received within a bearing sleeve or brass 39, which is in turn mounted within the bearing slot or notch 29 of the bearing block 27. Secured to the upper face of the bearing block 27 is a resilient plate 40 having a depending resilient arm 41 which overlies and closes the open front of the notch and normally bears against the bearing sleeve 39. An adjusting screw 42 is carried by the block and bears against the bearing sleeve or brass 39 and is held in an adjusted position by a lock nut 43.

The shaft or spindle 37 receives an elongated sleeve or hollow shaft 44 having spaced annular flanges 45 formed thereon for reception in rabbeted portions 46 formed in the bearing block 28 on opposite sides of the notch 30 formed therein. This prevents longitudinal movement of the hollow shaft or sleeve 44 in said bearing block. The opposite sides of the hollow shaft intermediate the annular flanges 45 are engaged by half bearings or brasses 47, the innermost half-bearing being engaged by an adjusting screw 48 carried by the bearing block 28 and this screw is held in an adjusted position by a locking nut 49. The upper face of the bearing block 28 has secured thereto a resilient bracket member 50 carrying a depending resilient arm 51 which overlies the open end of the notch 30 and retains the outer bearing brass section 47 in position.

By this construction, so far, it can be seen that by adjusting the screws 42 and 48 of the bearing blocks, the gauge bar 31 can be shifted in said bearing blocks laterally toward and away from the saw 16 so as to permit the same to be adjusted relative to the saw to take care of varying saw thickness incident to the sharpening of the saw.

It is obvious that by turning the spindle 37, a different gauge face can be brought into operative position relative to the upper face of the saw table and the saw 16 and I have provided novel means for turning the shaft or spindle 37, and consequently the gauge bar, and for locking the same in an adjusted position. This means embodies a hollow knurled head 52 slidably mounted on the hollow shaft or sleeve 44. The hollow shaft or sleeve 44 carries a radially extending pin 53, the inner end of which is fitted within the keyway 38 of the shaft or spindle 37 and the outer end of this pin is slidably received within a slot 54 formed in the inner end of the knurled head 52. The inner end of the knurled head is provided with a polygonal extension 55 of a square shape, and the upper edge of the bearing block 28 is provided with a laterally extending lip 56 which constitutes means for engaging any one of the faces of said polygonal reduced extension 55 for holding the head 52 and consequently the gauge bar in an adjusted position against turning movement. As stated, the hollow knurled head 52 is slidably mounted on the hollow shaft or sleeve 44 and an expansion spring 57 is fitted within the hollow head around the shaft or sleeve 44 and the inner end thereof bears against the head, while the outer end thereof bears against a plate 58 threaded on said hollow sleeve or shaft 44 and this plate also acts as a guide for the head 52 during its sliding movement. Thus, the spring 57 functions to normally urge the head inward, so that one flat face of the reduced polygonal extension 55 thereof will be in engagement with the lip 56 of the bearing block 28.

It is obvious that upon outward pull on the head 52, the reduced polygonal extension 55 thereof will be moved away from the lip 56 and the sliding movement of the head is permitted due to the slot 54 formed in said head. The head can now be turned for bringing the desired gauge face into operative position relative to the saw table and saw and it can be seen that when the head is turned, the pin 53 will be turned therewith consequently turning the spindle or shaft 37 and the gauge bar. Upon release of the head, the spring 57 will return the same to its innermost locked position.

Referring again to the gauge bar 31 it will be noted that the faces 32, 33 and 35 are all the same distance from the axial center of the gauge bar whereas the face 34 is a shorter distance from the axial center. Thus the faces 32, 33 and 35 will be disposed an equal distance above the face of the saw table when they are disposed in parallel facing relation thereto for use but the face 34 will be disposed a greater distance from the table than the other faces and can be used for gauging type bars having type faces higher than usual. The faces 33, 34 and 35 have rabbets extending longitudinally thereof and at one corner, indicated by the reference characters 60, 61 and 62, which are for the purpose of gauging the cutting of one pica (twelve points), one-half pica (six points) and twelve points for projection higher than type face. It should be noted that the gauge bar extends at right angles to the axis of the saw in a plane parallel to the plane of the saw as shown in Figure 11. The gauge when in use is slightly in advance of the teeth of the saw and as a type line is moved it may be cut without the saw striking the gauge. By shifting the gauge bar longitudinally upon its shaft wear upon the saw teeth can be compensated for and by turning the gauge bar about its pivotal mounting selected gauge faces and recesses can be brought into position for use.

From the foregoing description, it can be seen that the gauge bar is provided with four gauge faces and that the desired gauge face and rabbet can be readily moved to an operative position relative to the table and saw and that after the desired gauge face has been selected for the desired type of work, the type bars, slugs or the like can be readily placed on the table and slid into engagement with the desired face or rabbet for gauging the cutting of the work.

Changes in details may be made without departing from the spirit or the scope of this invention, but:

What I claim as new is:

1. In a printer's sawing machine including a saw and a saw table, a guide and gauge bar for the new saw table comprising a block of polygonal shape in cross section having four sides, three of said sides having steps of one pica, one-half pica, and one pica for projection higher than type face, the remaining side being provided with a plain face for facilitating the gauging of cutting projection higher than type body, the first mentioned sides having a common height from the table face, means rotatably supporting the gauge bar including a supporting bracket, means for turning and locking the gauge bar on the bracket, means for adjusting the gauge bar laterally of the bracket toward the saw, means hingedly connecting one end of the bracket to the saw table, and means for anchoring the front of the bracket to the front of the table.

2. A guide and gauge bar for the saw table of printers' sawing machines embodying a bracket extending longitudinally of the table and anchored thereto, the bracket including a pair of bearing blocks having bearings therein, a gauge bar of polygonal shape in cross section including a plurality of different gauge faces, spindles on the ends of the body received in the bearings, means for adjusting the bearings laterally of the blocks, a sleeve receiving one spindle and held in one bearing block against longitudinal movement, said spindle having a keyway, a key carried by the sleeve fitted in said keyway, a head slidably mounted on the sleeve having a reduced polygonal extension corresponding to the sides of the gauge bar, a lip formed on the last mentioned bearing block for engaging one of the sides of the reduced extension to hold the head against turning movement, said head being slotted to receive the key, and spring means normally urging the head toward the lip.

3. In a printer's sawing machine including a saw and a saw table, a guide and gauge bar for the saw table comprising a longitudinal extending block having a plurality of parallel gauge faces, means rotatably supporting the block parallel to the saw and above the table of the sawing machine, three of the gauge faces being common to each other as to height from the upper face of the saw table, the remaining side being type-face high plus from the upper face of the saw table.

4. In a printer's sawing machine including a saw and a saw table, a guide and gauge bar for the saw table comprising an elongated longitudinally extending body polygonal shaped in cross section having a plurality of gauge faces, means rotatably supporting the body parallel to the saw and above the table of the sawing machine, three of the faces having sets of different rabbets for facilitating the cutting of one pica and one-half pica from material and for cutting stops casted with slugs higher than the face of type.

5. In a printer's sawing machine including a saw and a saw table, a guide and gauge bar for the saw table comprising a longitudinally extending block of polygonal shape in cross section having a plurality of longitudinally extending gauging faces, one of said faces being higher from the upper face of the saw table than the other, said face carrying a rabbet to gauge the cut of material having a projection cast thereon which is to be cut, the difference of height from the table permitting face high material to be sawed in any designated length.

6. In a printer's sawing machine including a saw table and a saw guide and gauge bar for the saw table comprising a longitudinally extending gauge bar polygonal shaped in cross section having a plurality of gauge faces constituting a designated gauge for cutting printers' material, said gauge bar extending at right angles to the axis of the saw and disposed in a plane parallel to the plane of the saw, means for rotatably supporting the bar to permit the desired face to be brought into operative position, edge portions of the bar being formed with longitudinally extending recesses, and means for adjusting the bar toward and away from the teeth of the saw of the sawing machine, said adjustment being common to all sides of the bar to and from the saw teeth.

7. In a printer's sawing machine, including a saw table, a guide and gauge bar for the saw table comprising a longitudinally extending gauge bar, a supporting bracket extending longitudinally of the table of the sawing machine and anchored thereto, the bracket including a pair of bearing blocks having bearings therein, spindles on the ends of the gauge bar received in the bearings, a sleeve receiving one spindle and held in one bearing against longitudinal movement, said spindle having a keyway, a key carried by the sleeve fitted in said keyway, a head slidably mounted on the sleeve having a reduced polygonal extension corresponding to the sides of the gauge bar, a lip formed on the last mentioned bearing block for engaging one of the sides of the reduced extension to hold the head against turning movement, said head being slotted to receive the key, and spring means normally urging the head toward the lip.

8. In a printer's sawing machine including a saw and a saw table, a guide and a gauge bar for the saw table comprising a longitudinally extending block of polygonal shape in cross section having a plurality of longitudinally extending gauge faces for facilitating cutting of material higher than the body of a slug, means for rotatably supporting the bar on the saw table at right angles to axis of the saw in a plane parallel to the plane of the saw and permitting turning of the gauge bar to bring a desired gauge face into operative position parallel with the saw table, the said means being eccentric to the longitudinal axis of the gauge bar to cause the faces to be disposed different distances from the pivotal center of the bar.

In testimony whereof I affix my signature.

HERMAN A. AGRICOLA.